United States Patent
Deal et al.

(10) Patent No.: US 7,712,748 B2
(45) Date of Patent: May 11, 2010

(54) MOTOR VEHICLE SUSPENSION DEVICE

(75) Inventors: Michel Deal, Saint-Remy-En-Rollat (FR); Alain Vaxelaire, Romagnat (FR); Davy Vernier, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 432 days.

(21) Appl. No.: 11/631,496

(22) PCT Filed: Jun. 20, 2005

(86) PCT No.: PCT/EP2005/006633

§ 371 (c)(1),
(2), (4) Date: Sep. 10, 2007

(87) PCT Pub. No.: WO2006/002795

PCT Pub. Date: Jan. 12, 2006

(65) Prior Publication Data

US 2008/0042329 A1    Feb. 21, 2008

(30) Foreign Application Priority Data

Jul. 2, 2004    (FR)    .................... 04 07409

(51) Int. Cl.
*B60G 3/26*    (2006.01)
(52) U.S. Cl. ............................ 280/5.521; 280/124.135; 280/124.5; 280/86.757
(58) Field of Classification Search ................ 280/5.52, 280/5.521, 86.751, 86.757, 124.135, 124.136, 280/124.138, 124.139, 124.15
See application file for complete search history.

(56) References Cited

U.S. PATENT DOCUMENTS

| | | | | | |
|---|---|---|---|---|---|
| 3,137,513 | A | * | 6/1964 | Marot | 280/124.103 |
| 5,431,429 | A | * | 7/1995 | Lee | 280/124.139 |
| 5,620,199 | A | * | 4/1997 | Lee | 280/5.521 |
| 5,700,025 | A | * | 12/1997 | Lee | 280/86.751 |
| 5,984,330 | A | * | 11/1999 | Hasshi et al. | 280/124.146 |

(Continued)

FOREIGN PATENT DOCUMENTS

EP    1 247 663 A1    3/2002

(Continued)

*Primary Examiner*—Ruth Ilan
(74) *Attorney, Agent, or Firm*—Cohen Pontani Lieberman & Pavane LLP

(57) ABSTRACT

A support system (3,5,54,55) designed to connect a wheel (2) to suspension elements (4,41,74,75,76) of an automobile, the support system including a cambering device that confers upon the wheel carrier (3) a degree of camber freedom relative to the suspension elements, the cambering device including a triple hinge (5), the triple hinge including three essentially longitudinal axes, the triple hinge including two flanges (52, 53) and two levers (54, 55), each of the levers being respectively attached to one of the two flanges. The levers are connected on the one hand to the wheel carrier (3) and on the other hand to the suspension elements. The camber movement of the wheel carrier takes place around an instantaneous centre of rotation (CIR r/s), a lateral distance "dl" separating the transverse position of the instantaneous centre of rotation (CIR r/s) from the transverse position of the wheel base (BR). The system is also configured such that the distance (dl) remains smaller than 40 mm during a camber deflection ($\alpha$) of 0° to −3°.

13 Claims, 12 Drawing Sheets

U.S. PATENT DOCUMENTS

| | | | |
|---|---|---|---|
| 6,170,838 B1 * | 1/2001 | Laurent et al. | 280/5.508 |
| 6,688,620 B2 * | 2/2004 | Serra et al. | 280/124.135 |
| 7,222,863 B2 * | 5/2007 | Deal et al. | 280/5.521 |

FOREIGN PATENT DOCUMENTS

| | | | |
|---|---|---|---|
| EP | 1 275 534 A1 | | 6/2002 |
| FR | 2 806 693 | * | 9/2001 |
| WO | WO 01/72572 A | | 10/2001 |
| WO | WO 2004/058521 A | | 7/2004 |

\* cited by examiner

MOTOR VEHICLE SUSPENSION DEVICE

RELATED APPLICATION

This is a U.S. National Phase Application under 35 USC 371 of International Application PCT/EP2005/006633, filed on Jun. 20, 2005.

FIELD OF THE INVENTION

The present invention concerns the ground contact system of automobiles, in particular wheel suspension and support systems that allow a degree of camber freedom of the wheel relative to the suspension elements. The term "ground contact system" covers all the elements and functions present, which are active upon or which influence the relation between the body of the vehicle and the ground over which it is moving. Thus, the parts of the ground contact system are in particular the following elements: tyre, wheel, wheel bearing, wheel carrier, braking elements, suspension elements (arms, wishbones, force strut, etc.), springs, dampers, articulations, anti-vibration elements, anti-roll, anti-blocking and anti-skid systems, steering system and path control system.

The invention concerns passenger cars and racing automobiles.

BACKGROUND OF THE INVENTION

International application WO 01/72572 describes a wheel support device that allows for a degree of camber freedom of the wheel relative to the suspension elements. This degree of freedom is controlled either in an active way, for example by a jack as a function of rolling parameters of the vehicle, or passively by the forces exerted on the wheel in the contact area.

European patent application EP 1247663 also concerns such systems and proposes to guide the camber movement of the wheel by using an element which pivots around a substantially vertical axis articulated between the wheel carrier and the suspension elements.

European patent application EP 1275534 also concerns such systems and proposes the use of a curved slide-bar to guide the camber movement of the wheel carrier relative to the suspension elements.

One of the difficulties encountered in the design of these systems stems from the fact that large forces have to be transmitted from the road to the body (and vice-versa) via the ground contact system and in particular the tyre, the wheel carrier and the suspension. These forces produce large mechanical stresses with all the consequences that result from these for the guiding precision of the wheel and for the reliability of the systems. Viewed from the body of the vehicle, the forces transmitted by the road are generally divided as follows: a transverse force (horizontal and perpendicular to the wheel plane), a longitudinal force (horizontal and parallel to the wheel plane), a vertical force, a torque called the "spin" torque (around the axis of the wheel), a torque called the "overturning" torque (around the longitudinal axis) and a "self-alignment" torque (around the vertical axis). In addition to these forces transmitted by the road, the wheel transmits to the body forces stemming from the inertia forces it undergoes, in particular the centrifugal force which acts around curves.

In the support and suspension systems described in the patent applications mentioned earlier, by comparison with conventional suspension systems a degree of freedom has been provided so as to allow some wheel camber relative to the body. This additional mobility can be provided in several different ways but common to them all is the fact that increasing the number of components and articulations or pivots tends to decrease the rigidity and/or robustness of the system as a whole. Moreover, it is difficult to compensate this rigidity deficit by enlarging the sections of the various elements because the space available is generally limited. In effect, such variable-camber suspensions should preferably not interfere with the compromises established in the context of space occupied (the term "packaging" is also used).

A problem of these systems is therefore their less than perfect rigidity, in particular in relation to the longitudinal force, the self-alignment torque and the rolling torque.

In the application WO 01/72572 it is proposed, for passive systems, that the instantaneous centre of rotation for the camber movement of the wheel relative to the suspension elements should be located below ground level so that the transverse forces acting in the contact area generate a torque which tends to tilt the wheel plane in the direction desired (this instantaneous centre of rotation is called the "first instantaneous centre of rotation" in the document WO 01/72572). However, although under this condition the transverse forces generate a torque along the camber axis which tends to tilt the wheel in the direction desired, the efficacy in terms of camber variation is very different depending on the configurations used. Yet in practice, the sensitivity of the camber to forces in the contact area is an important criterion. In effect, it is generally sought to design a wheel support and suspension system such that the passive camber variation is predictable, stable and satisfactory in terms of maximum inclination. This is particularly important for high-performance vehicles. For such vehicles the search for optimum performance includes optimisation of the longitudinal and transverse grip. This optimisation is only possible if the camber angle of the wheel is at all times ideal for the operation of the tyre. An ideal camber from the standpoint of tyre grip is a camber that allows optimisation of the pressure distribution in the contact area, i.e. one which, for example, allows compensation of the effect on the pressure distribution in the contact area that results from lateral deformations of the tyre when it is slipping (typically, while rounding a bend).

SUMMARY OF THE INVENTION

One object of the invention is to provide a system whose operation is preferably essentially passive and which enables at least some of the disadvantages mentioned above to be overcome.

This and other objects are attained in accordance with one aspect of the present invention directed to a support system designed to connect a wheel to suspension elements of an automobile, the support system comprising cambering means which confer upon the wheel carrier a degree of camber freedom relative to the suspension elements, the cambering means comprising a triple hinge, the triple hinge comprising three essentially longitudinal axes, the triple hinge being connected on the one hand to the wheel carrier and on the other hand to the suspension elements, the triple hinge comprising two flanges and two levers, each of the levers being respectively attached to one of the two flanges, the levers being connected on the one hand to the wheel carrier and on the other hand to the suspension elements, the camber movement of the wheel carrier taking place around an instantaneous centre of rotation, a lateral distance "dl" separating the transverse position of the instantaneous centre of rotation (CIR r/s) from the transverse position of the base of the wheel, the system also being configured such that the distance (dl) remains less than 40 mm during a camber deflection of 0° to −3°.

Preferably, the support system is also configured such that the said distance (dl) remains less than 40 mm during a camber deflection of 0° to −4°, preferably −5°, preferably −6°, preferably −7°, preferably −8°, and preferably over the whole of the useful negative camber deflection.

Preferably, the support system is also configured such that the said distance (dl) remains less than 20 mm and preferably 10 mm.

Preferably, the support system is also configured such that the said distance (dl) remains less than 40 mm, preferably 20 mm and preferably 10 mm during a camber deflection of 0° to +10, preferably +2°, preferably +3°, preferably +4°, preferably +5°, preferably +6°, preferably +7°, preferably +8° and preferably over the whole of the useful positive camber deflection.

Preferably, since the instantaneous centre of rotation is located below ground level and at a vertical distance from the ground, the support system is also configured such that the vertical distance corresponding to the maximum positive camber deflection is larger than the vertical distance corresponding to zero camber, preferably larger than 1.5 times the vertical distance corresponding to zero camber, and preferably 2.5 times.

Preferably, the support system also comprises a camber damper which acts between the wheel carrier and the intermediate support.

Another aspect of the invention is directed to a suspension system for an axle comprising a support system as described above for each of the two wheels of the axle.

Preferably, this suspension system also comprises camber connection means that enable the camber movements of the two wheels to be linked.

It is also preferable for the camber connection means to use a link between two jacks which act between the wheel carrier and the intermediate support of each wheel of the axle. Alternatively, the camber connection means comprise mechanical links acting between the wheel carrier of each wheel of the axle.

Preferably, the suspension system also comprises at least one upper arm and one lower arm, the lower arm being connected directly to the inner flange of the triple hinge and the upper arm being connected directly to the lever attached to the outer flange of the triple hinge.

Another aspect of the invention is directed to an automobile comprising the suspension system.

DETAILED DESCRIPTION OF THE DRAWINGS

In the various figures, identical or similar elements have the same index numbers. Their description is therefore not repeated systematically.

Figure 1:
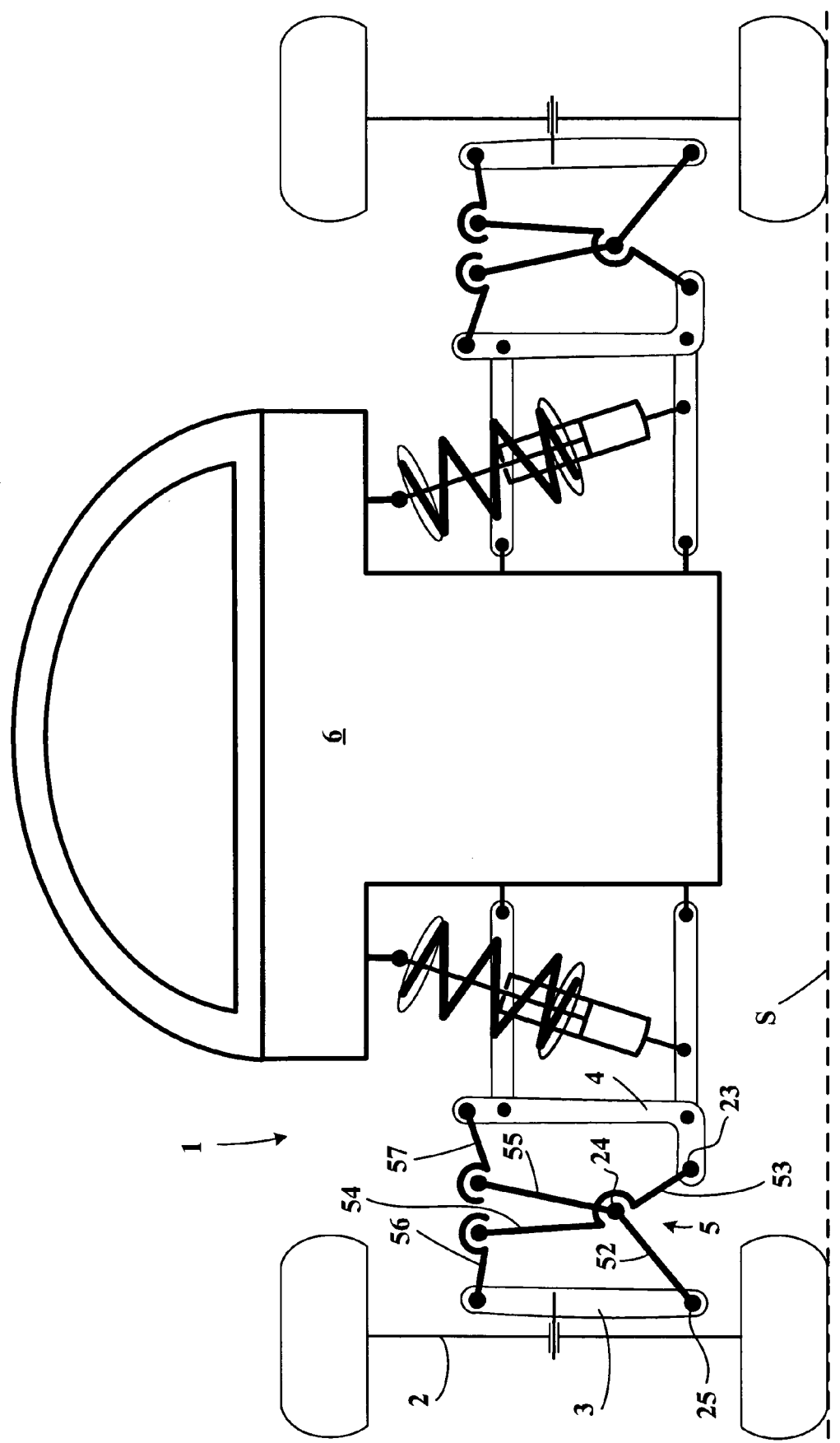
FIG. 1: Schematic plan view of a vehicle according to an embodiment of the invention.

FIG. 1 represents schematically a vehicle according to an embodiment of the invention. The description that follows is focused on the left part of the figure. The suspension system 1 comprises a wheel support system which allows camber variations of the wheel 2 relative to an intermediate support 4. The intermediate support 4 is connected to the other suspension elements (arms, wishbones, springs) in a manner known in itself, to allow essentially vertical suspension movements. According to the invention, the wheel carrier 3 is connected to the intermediate support 4 via camber means which have two essentially independent functions. The first of these functions is a connection allowing a planar movement and embodied by a "triple hinge" 5. The triple hinge 5 is articulated along three axes: an inner axis 23 connecting an inner flange 53 to the intermediate support 4, an outer axis 25 connecting an outer flange 52 to the wheel carrier 3, and a central axis 24 connecting the inner 53 and outer 52 flanges to one another. These axes are essentially longitudinal, i.e. essentially horizontal and parallel to the wheel plane 2. This connection allows movements of the wheel carrier 3 relative to the intermediate support 4 in the camber plane, while effectively blocking any relative rotation around the vertical and transverse axes. The second function, which is that of steering the wheel carrier during its movement in the camber plane, is effected via levers 54 and 55 attached respectively to the flanges 53 and 52 of the triple hinge 5. Track-rods 56 and 57 connect the upper ends of the levers 54 and 55 on the one hand to the wheel carrier and on the other hand to the intermediate support 4. It can be seen in the figure that the triple hinge S and its levers 54 and 55 act in the manner of a pair of scissors interposed between the wheel carrier and the suspension elements. It is the configuration of this pair of scissors which determines the kinematics of the wheel carrier (and the wheel 2) relative to the intermediate support 4 in the camber plane.

Figure 2:
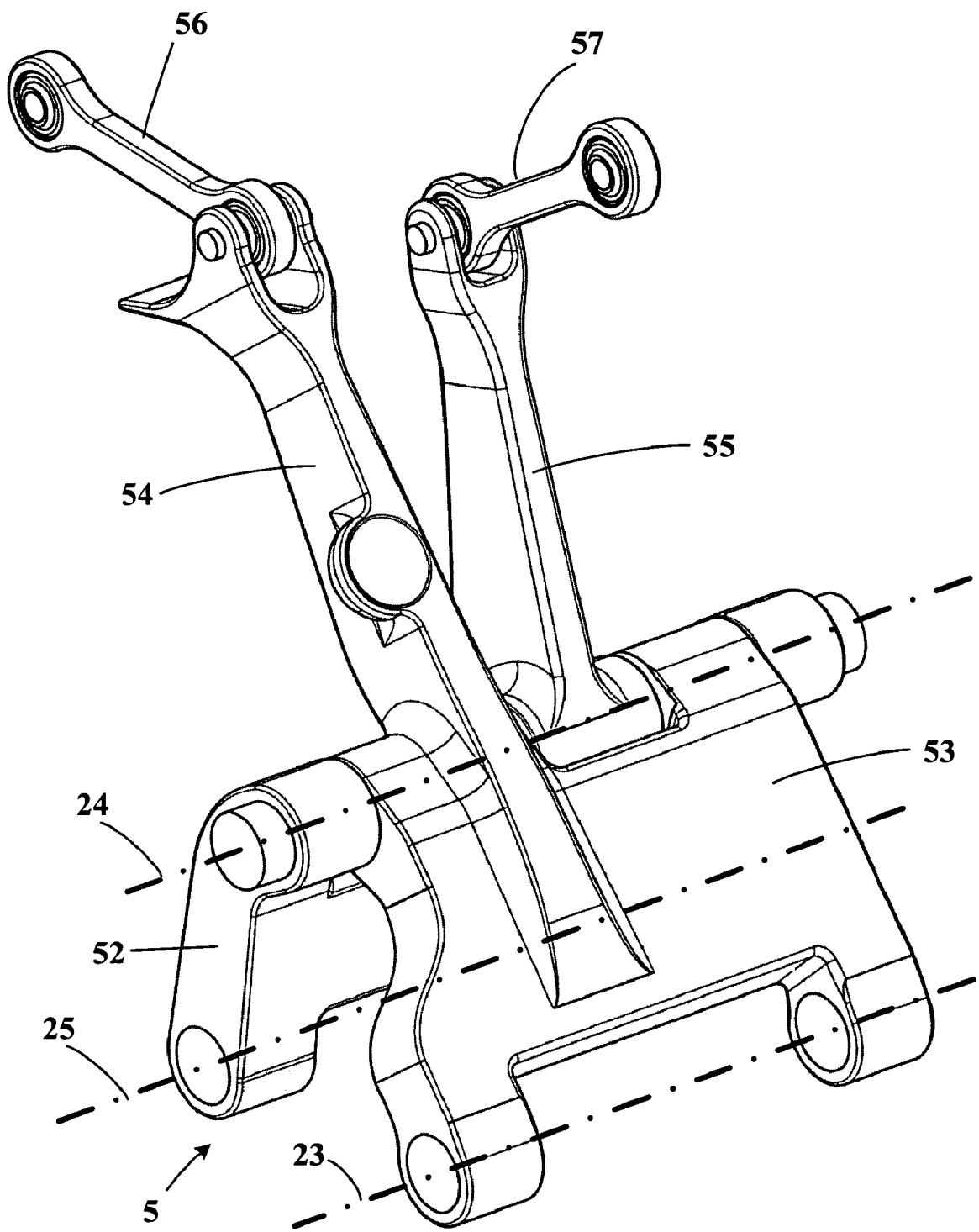
FIG. 2: Schematic view of an embodiment of the triple hinge of the system according to the invention

FIG. 2 shows a preferred embodiment of the cambering means according to the invention. The figure shows a triple hinge 5, levers 54 and 55 and track-rods 56 and 57 according to the principle described in FIG. 1. The wheel carrier and the intermediate support are not shown. In this figure the effect of the flanges 52 and 53 of the triple hinge 5 in terms of rigidity can be seen clearly. In contrast, the levers 54 and 55 attached respectively to the flanges 52 and 53 of the triple hinge 5, having only the function of guiding the movements in the camber plane, do not have to support very large mechanical forces. The levers 54 and 55 are preferably offset relative to one another in order to be able to cross if necessary.

Figure 3:
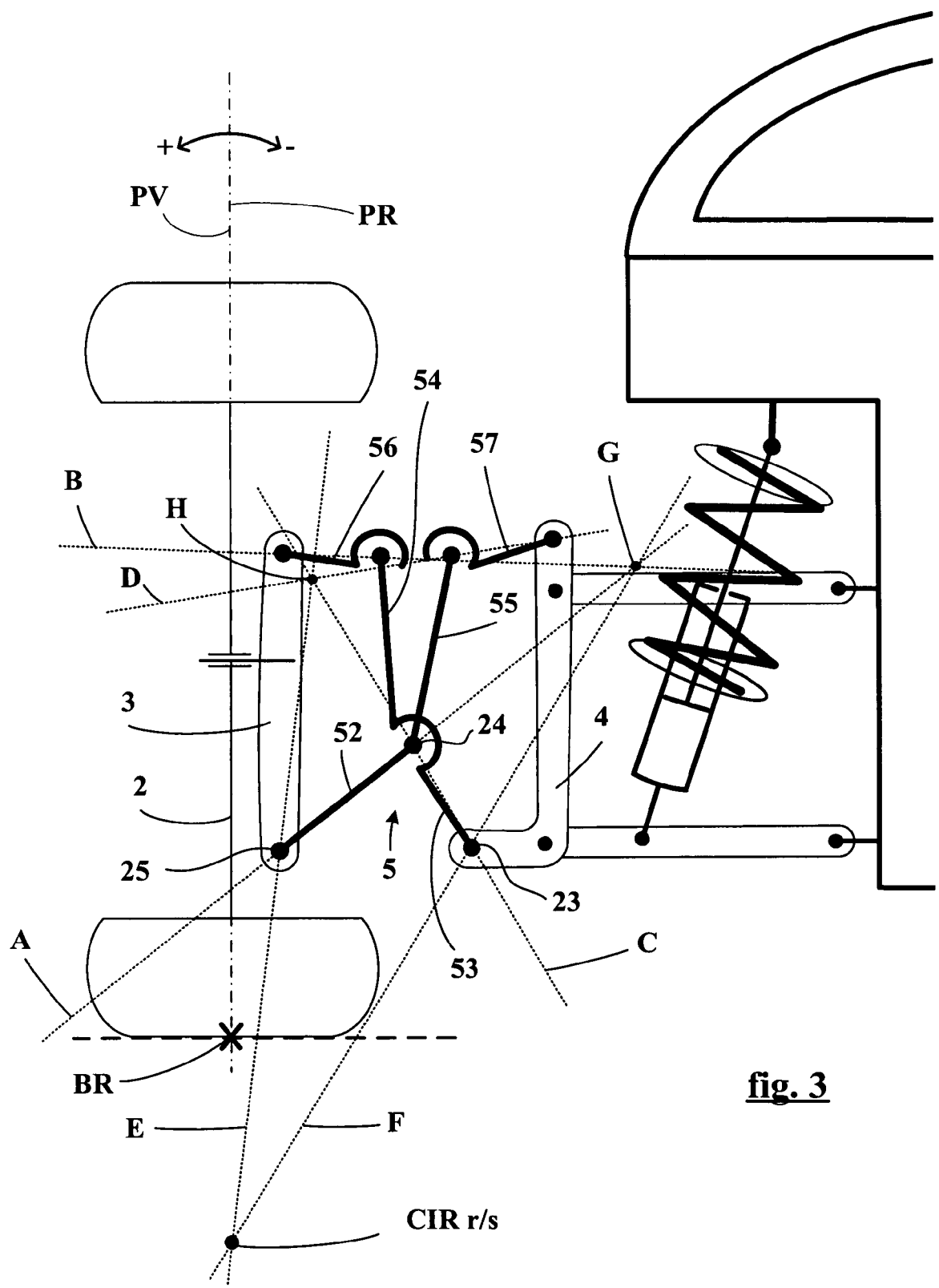
FIGS. 3 and 4: Schematic plan views of the suspension system of the vehicle in FIG. 1

FIG. 3 repeats the left-hand portion of FIG. 1 in order to show details of other characteristics of the invention. In this figure the wheel 2 is represented in a position of zero camber. The position in the camber plane of the instantaneous centre of rotation (CIR r/s) of the wheel 2 (and the wheel carrier 3) relative to the intermediate support 4 can be determined graphically as follows: on the one hand, the intersection (G) of the line A corresponding to the orientation of the outer flange 52 of the triple hinge 5 with the line B corresponding to the orientation of the track-rod 56 is determined; on the other hand, the intersection (H) of the line C corresponding to the orientation of the inner flange 53 of the triple hinge 5 with the line D corresponding to the orientation of the inner track-rod 57 is determined; the line E joining the point H and the pivot (outer axis 25) of the outer flange 52 on the wheel carrier 3 is then constructed; the line F joining the point G and the pivot (inner axis 23) of the inner flange 53 on the intermediate support 4 is then constructed; the instantaneous centre of rotation (CIR r/s) of the camber movement of the wheel carrier 3 relative to the intermediate support 4 is then at the intersection of the lines E and F. It will be understood that the position of the instantaneous centre of rotation is the consequence of the combination of geometrical characteristics and positions of the numerous components of the system. In this particular example and in the vertical position of the wheel shown, the instantaneous centre of rotation is below ground level. Moreover, in the zero-camber position the instantaneous centre of rotation is located essentially in the wheel plane (PR), which is a preferred feature of the invention.

The wheel plane (PR) is the plane related to the wheel which is perpendicular to the axis of the wheel and passes through the centre of the ground contact area when the camber of the wheel is zero. When the wheel tilts, the wheel plane also tilts and may then no longer pass through the centre of the contact area. This for example is the case when the tyre is deformed by the transverse forces it undergoes when rounding a bend.

The "wheel base" is the intersection (BR) of the wheel plane (PR) and the ground (S).

As is conventional in the automobile field, the camber angle of the wheel is termed positive when the wheel is tilted towards the outside of the vehicle and negative when it is tilted towards the inside. The reference is thus the vertical plane (PV), which is longitudinal relative to the vehicle.

Figure 4:
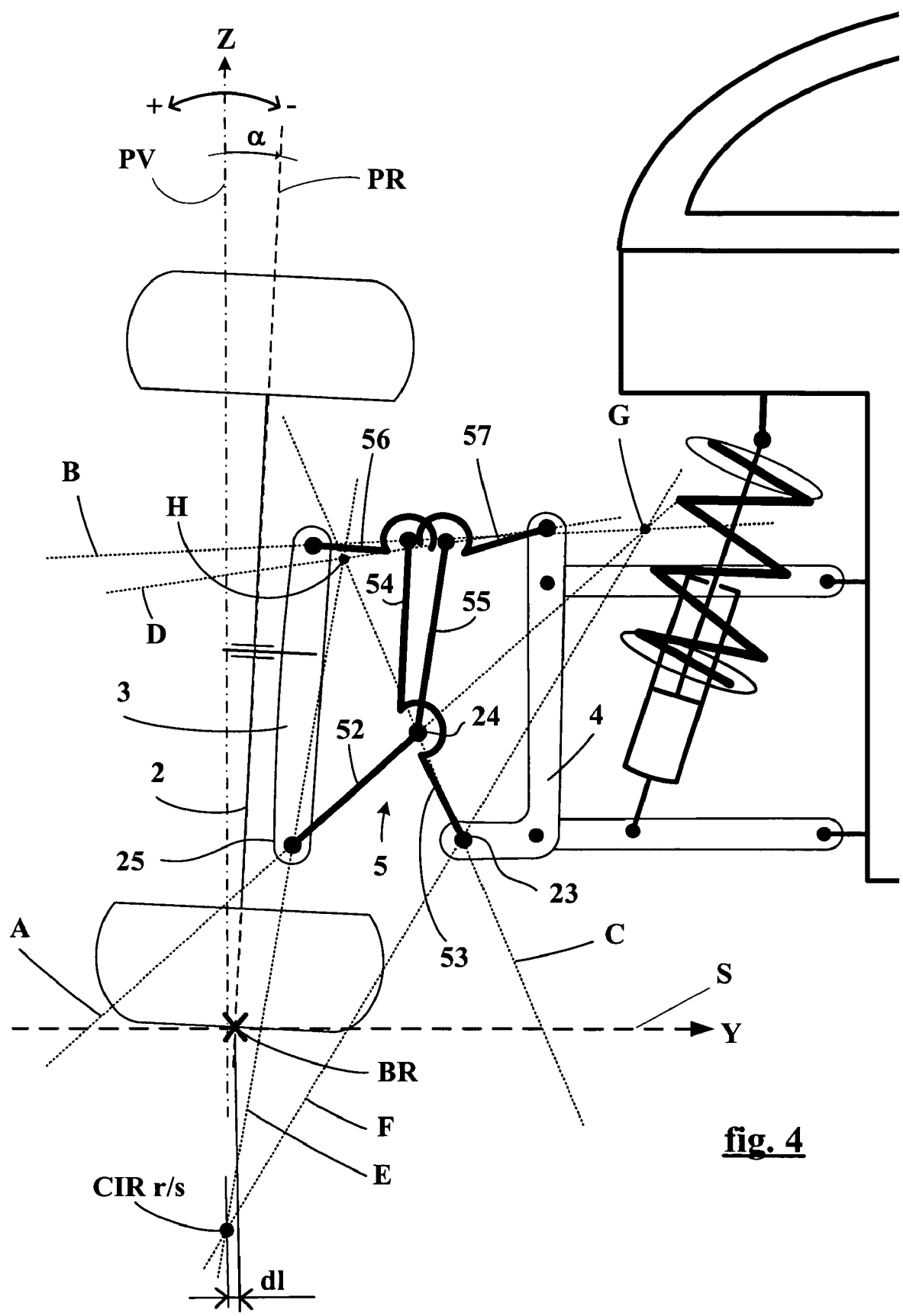

FIG. 4 is similar to FIG. 3 but shows the system in a negative camber position. The wheel plane PR is inclined by a few degrees (α) inwards. It can also be seen that the positions of the flanges and levers of the triple hinge and those of the track-rods have changed compared with FIG. 3. A graphical construction similar to the one described earlier enables the position of the instantaneous centre of rotation (CIR r/s) to be determined. In this example the said position is found to have changed little. The wheel base BR has moved slightly, here towards the inside of the vehicle. Agreeing to call "the lateral distance" (dl) that distance which laterally (or transversely) separates the position of the instantaneous centre of rotation (CIR r/s) from the wheel base BR, then in accordance with the indexing (BR; Y; Z) used in the figure, if $Y_{CIR}$ is the transverse position of the instantaneous centre of rotation (CIR r/s) and if $Y_{BR}$ is the transverse position of the wheel base (BR), then the lateral distance (dl) is equal to the absolute value of the difference $Y_{CIR}-Y_{BR}$. In the figure, the lateral distance can be visualised as the distance separating the instantaneous centre of rotation from a vertical line extending from the wheel base (BR).

An essential characteristic of an embodiment of the invention concerns this lateral distance. According to the invention, the support system must be configured so that during a camber deflection of 0° to −3° the lateral distance never exceeds 40 mm, preferably 20 mm and still more preferably 10 mm. If the system allows larger counter-camber angles to be reached (−4°, −5°, −6°,−7°, −8° etc.) the same maximum lateral distance must preferably also be respected over the whole of the useful negative camber deflection.

A preferred characteristic of the support system according to an embodiment of the invention concerns the same lateral distance (dl) during a positive camber deflection.

Figure 5:
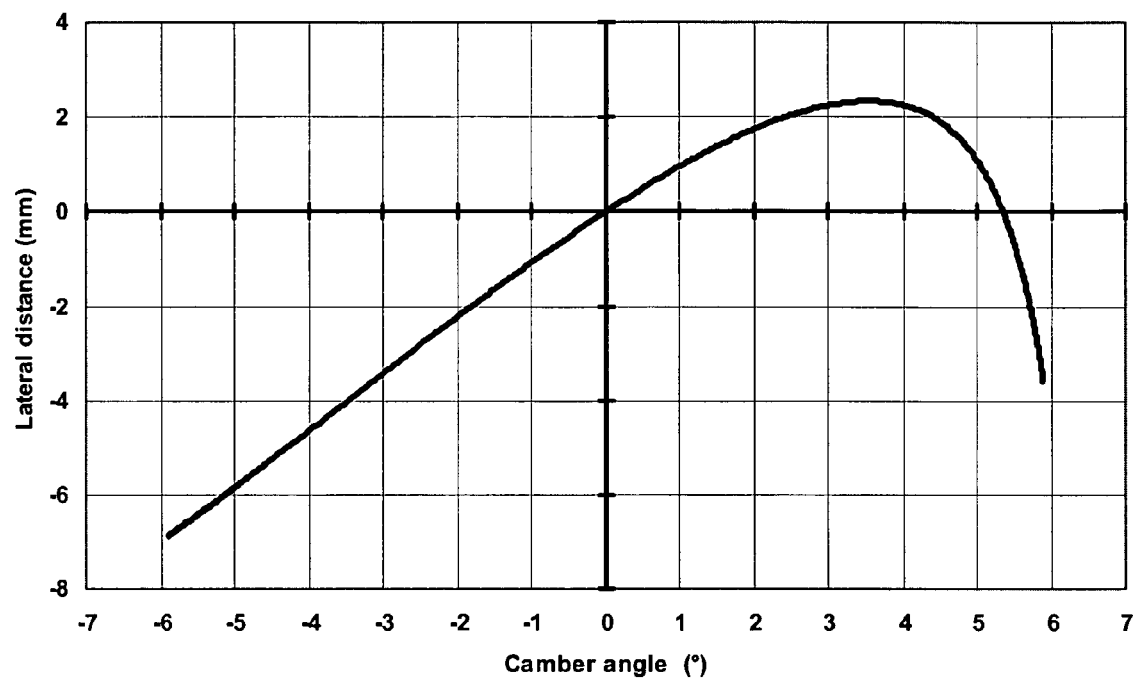
FIG. 5: Graph showing the lateral distance as a function of the camber angle

FIG. 5 is a graph which, for a preferred embodiment of the invention, shows the evolution of the lateral distance during a camber deflection of practically −6° to +6°. The maximum lateral distance reached for a negative camber is in this case about 7 mm for an angle of −6°. A negative distance value means that the instantaneous centre of rotation is located outside the wheel base (this also being the case shown in FIG. 4). The maximum lateral distance reached for a positive camber is here about 2.5 mm at an angle of +3.5°. Note that in this case the lateral distance is zero for a zero camber angle.

A preferred characteristic of the support system according to an embodiment of the invention concerns the vertical position of the instantaneous centre of rotation relative to ground level (S). The instantaneous centre of rotation at zero camber is preferably a vertical distance ($Z_0$) under the ground. Preferably, the system is also configured so that the vertical distance ($Z_{MAX}$) corresponding to the maximum positive camber deflection is larger than the vertical distance ($Z_0$) corresponding to zero camber. More preferably, $Z_{MAX}$ is larger than 1.5 times $Z_0$ and still more preferably larger than 2.5 times $Z_0$.

Figure 6:
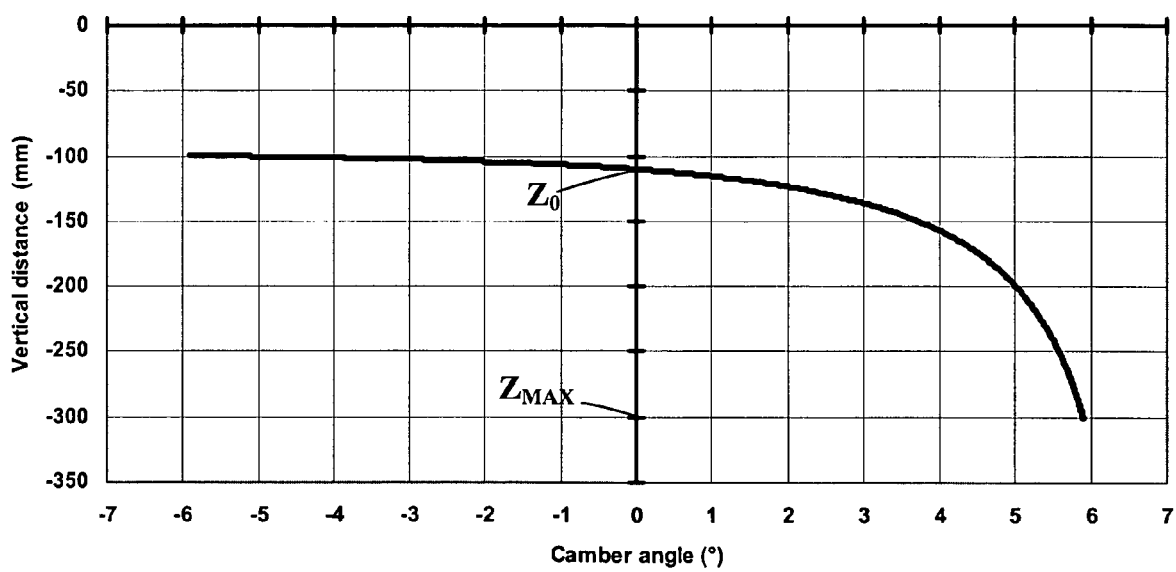
FIG. 6: Graph showing the vertical distance as a function of the camber angle

FIG. 6 is a graph showing, for a preferred embodiment of the invention, the evolution of the vertical distance during a camber deflection of practically −6° to +6°. A negative distance value means that the instantaneous centre of rotation is below ground level. In this example $Z_0$ is about 110 mm and $Z_{MAX}$ is about 300 mm (for a maximum camber close to +6°). Thus, in this example $Z_{MAX}$ is more than 2.5 times larger than $Z_0$.

Figure 7:
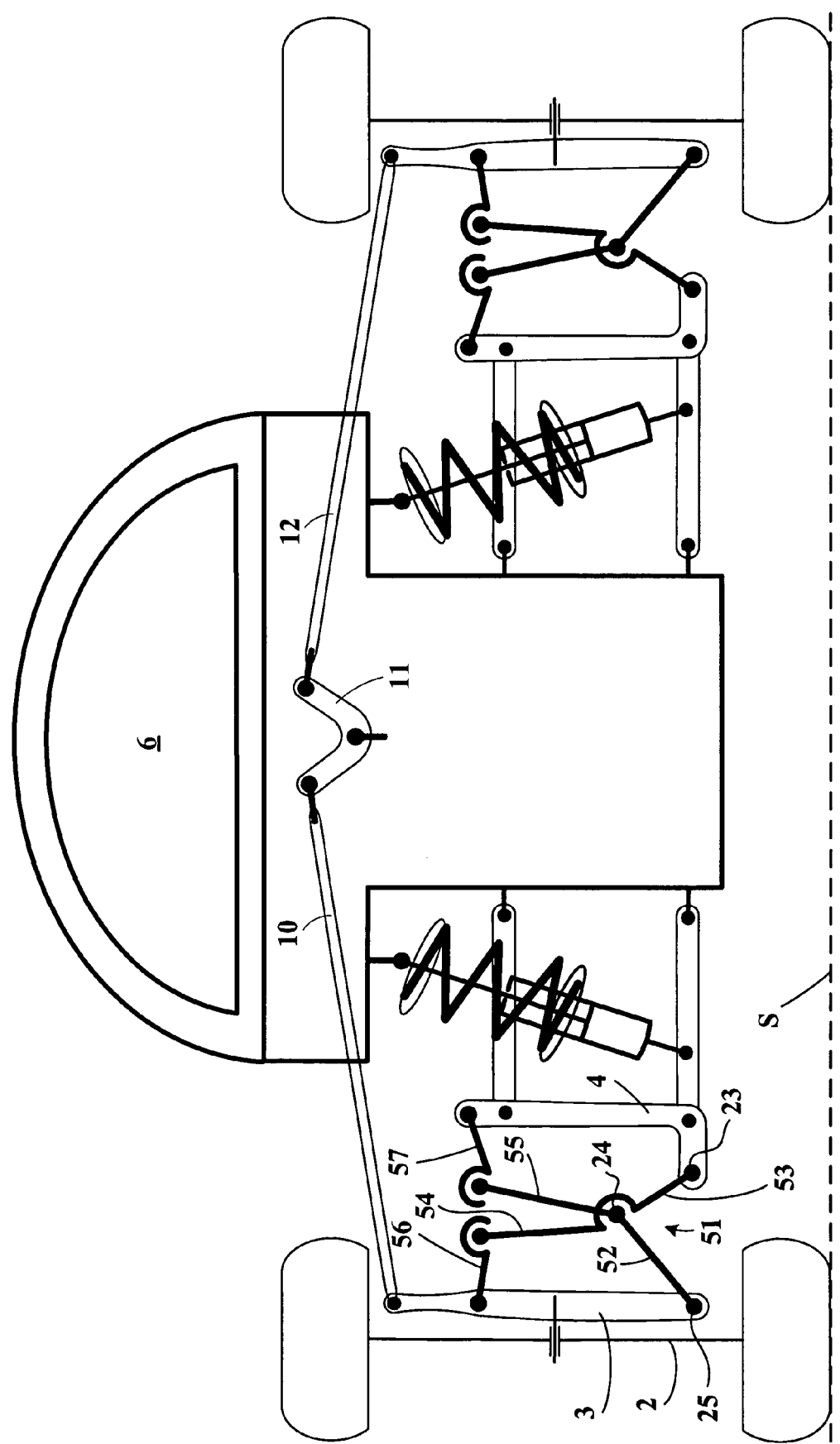
FIG. 7: Schematic plan view of an embodiment of the vehicle according to the invention

FIG. 7 shows schematically an embodiment of the invention in which camber connection means enable the camber movements of the wheel 2 to be linked with those of the opposite wheel. The connection means can for example take the form illustrated here, of a thrust-rod 10 controlled by the wheel carrier 3 and acting via a rocker 11 on an opposed thrust-rod 12 connected to the wheel carrier of the opposite wheel. The geometrical configuration of the thrust-rods and the rocker can be adapted so as to obtain a given behaviour of the camber of one wheel relative to the other. In effect, it may for example be advantageous to obtain a different camber variation of each wheel (inside and outside) around a bend. A principle of this embodiment of the invention is to combine the energy transmitted by the ground to each wheel in order to obtain a coherent camber variation of both wheels on the axle independently of the proportion of energy transmitted to each wheel in isolation. Blocking or active control means can also be involved in this link. For example, a locking device can prevent camber movements beyond a given transverse acceleration threshold in order to stabilise the vehicle in a straight line.

Figure 8:
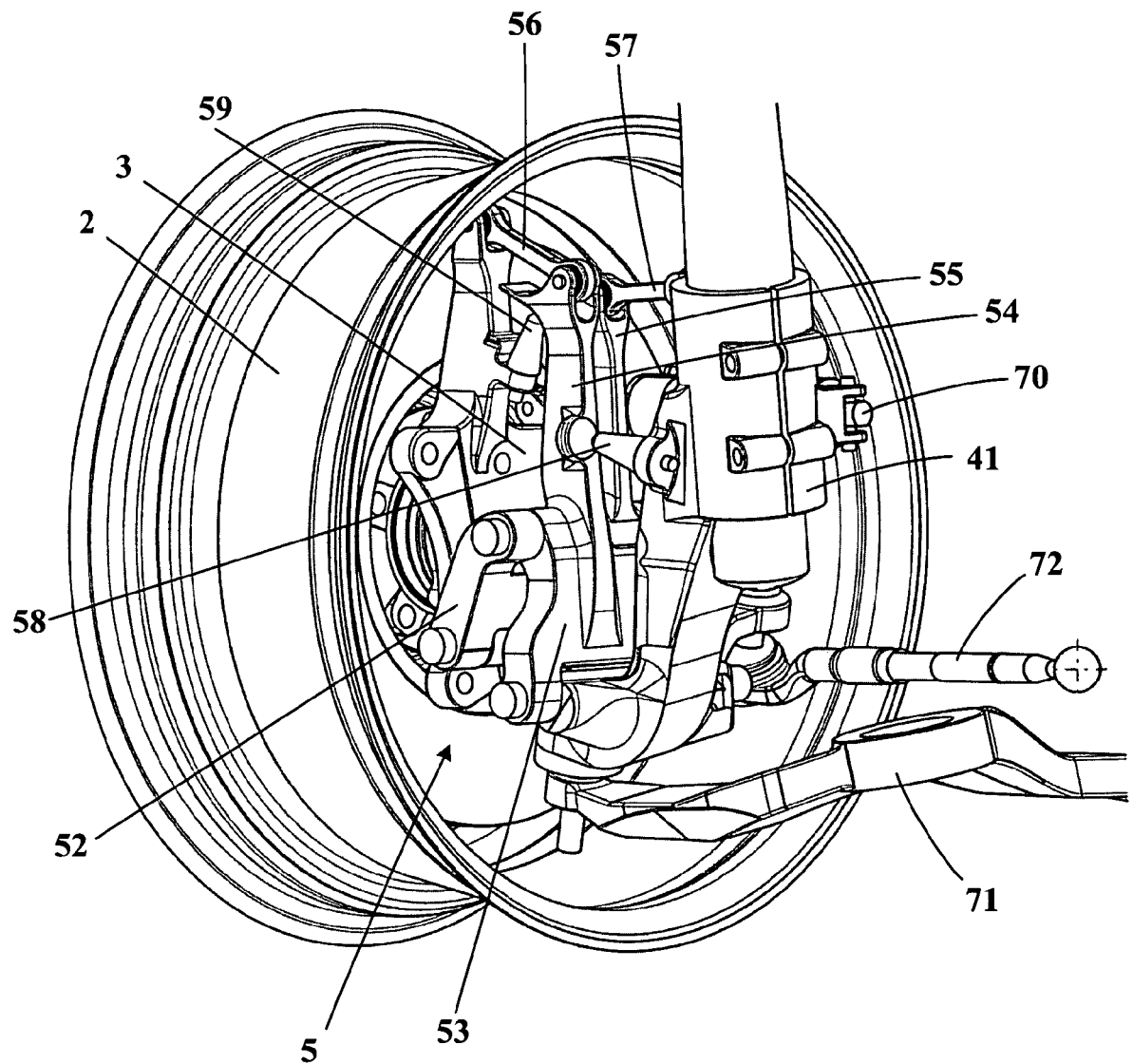
FIGS. 8 and 9: Perspective views of an embodiment of the invention using a MacPherson force strut

FIG. 8 shows an embodiment of the suspension system according to the invention which incorporates the cambering means described in particular by FIG. 2. In this example it is based on a MacPherson suspension known in itself. The force strut 41 is guided relative to the chassis by its upper attachment (not shown), by a lower wishbone 71 and by a track rod 72. The lower portion of the force strut 41 in this case plays the part of the intermediate support (4) in the preceding figures. According to the invention, the longitudinal force and the self-alignment and rolling torques are taken up by the triple hinge 5. The stresses passing through the levers 54 and 55 are reduced because they involve only the cambering torque and a (reduced) part of the transverse forces. If the architecture described here is compared with that of FIG. 2 of international application WO 01/72572, the contribution regarding stiffness made by the invention is easy to understand.

Cambering abutments (58, 59) can be used to limit the extent of the cambering movements. In this preferred embodiment a counter-camber abutment 58 is arranged between the inner lever 54 and the force strut 41 and a camber abutment 59 is arranged between the inner lever 54 and the wheel carrier 3. Besides their movement-limiting role, the abutments can also usefully influence the passive behaviour of the system. In effect, their shapes and dimensions can introduce variable stiffnesses and damping as a function of the camber deflection. The abutments are preferably made of an elastomeric material such as rubber.

The track-rods 56 and 57 can comprise means which enable their length to be varied, for example in order to be able to modify the kinematic definition described in FIG. 3.

A camber damper 70 (the end of whose rod can be seen) can for example be arranged between the force strut 41 and the wheel carrier 3 and can constitute additional means for influencing the passive behaviour of the support system according to the invention. Alternatively, an active element such as a jack (for example hydraulic, pneumatic or electric) can enable active control of the camber.

Figure 9:
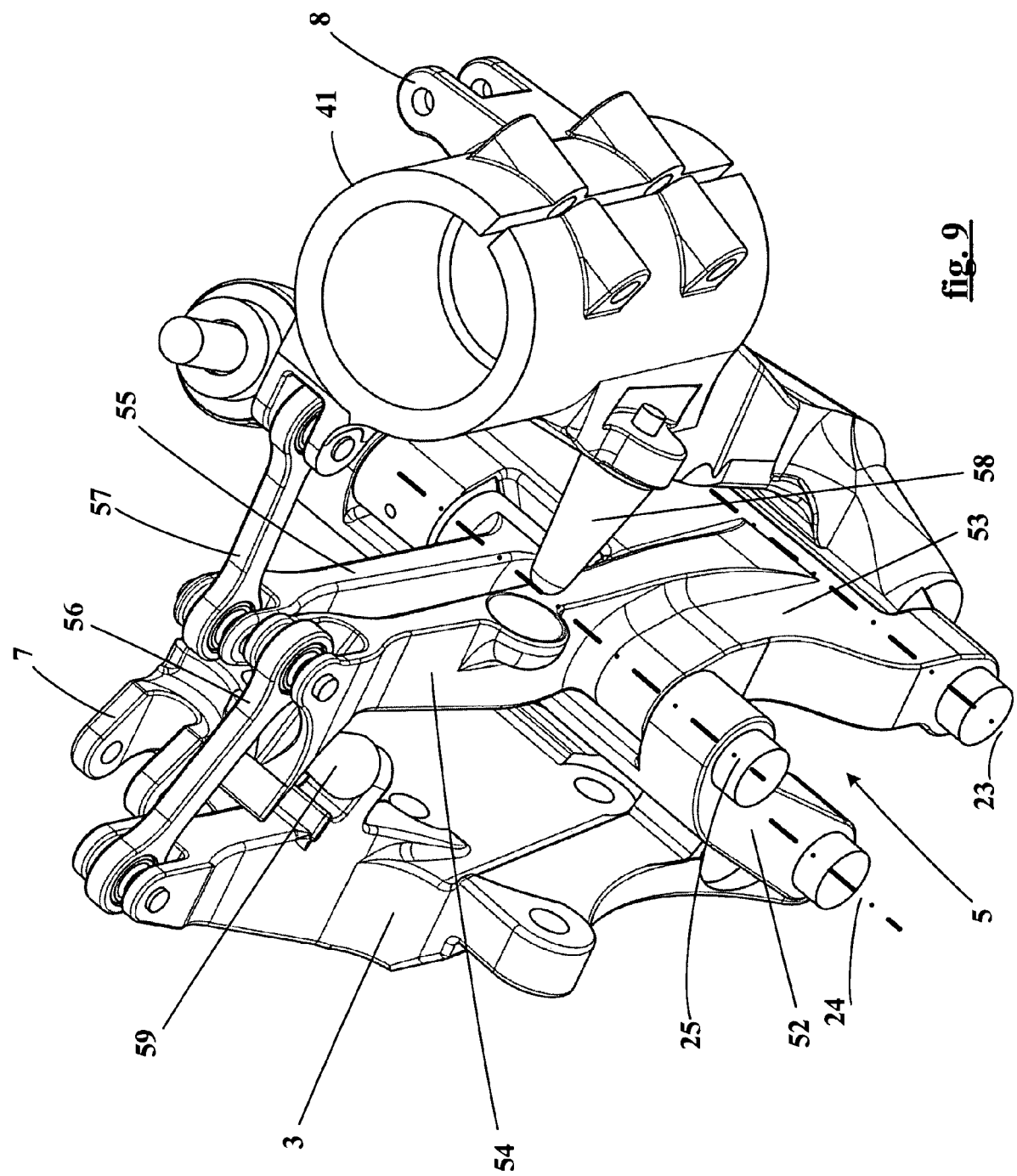

FIG. 9 shows the system of FIG. 8 viewed from a different angle. In this view the wheel, the lower wishbone, the upper portion of the force strut, the steering rod and the camber damper have been left out in order to facilitate reading the figure. It is therefore easier to visualise in particular the axes 23, 24 and 25 of the triple hinge 5, the progressive abutments 58 and 59, and the caps 7 (on the wheel carrier) and 8 (on the force strut) designed to receive a camber damper or actuator.

Figure 11:
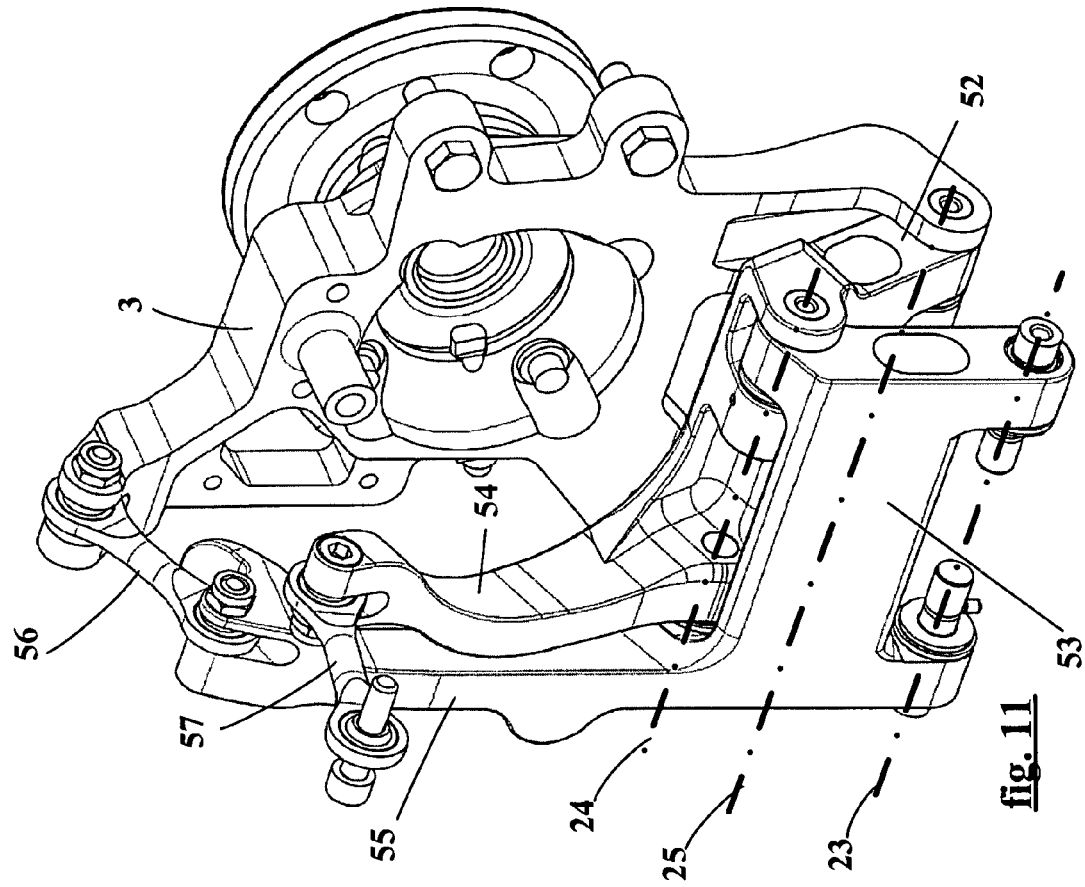
FIGS. 10 and 11: Perspective views of another embodiment of the invention
Figure 10:
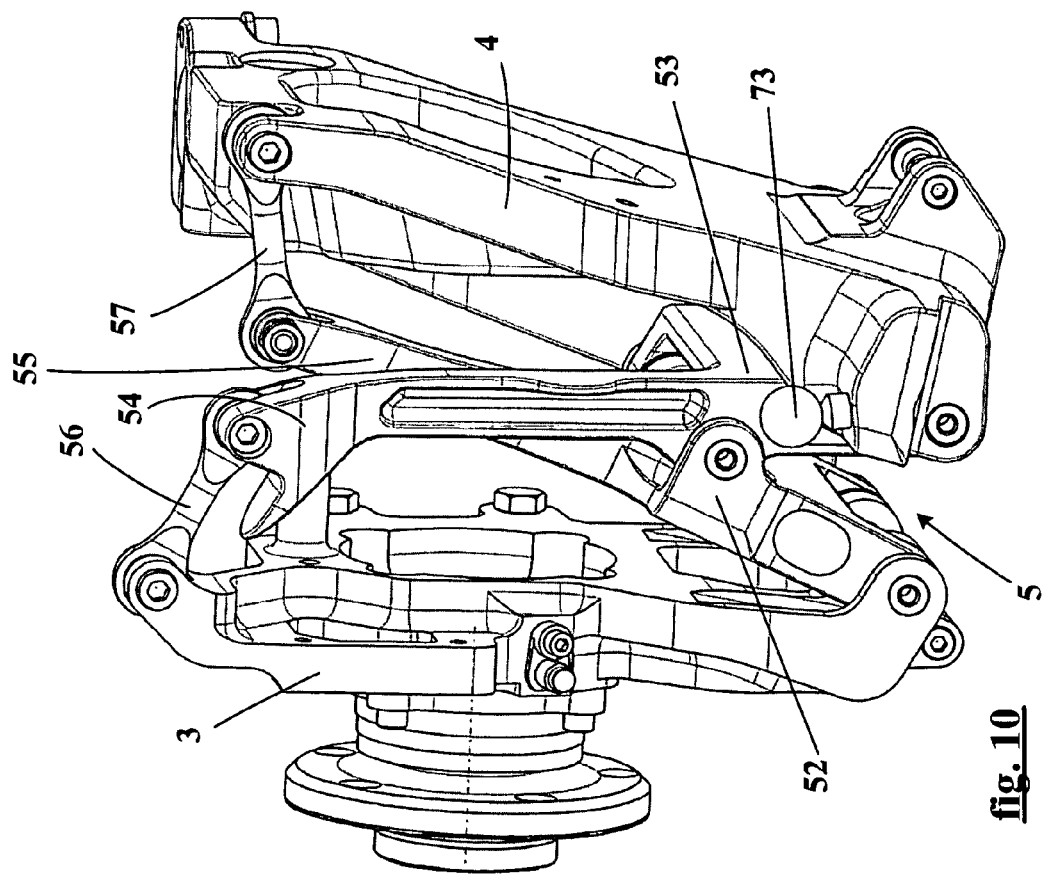

FIGS. 10 and 11 are two views of another embodiment of the support system according to the invention adapted more particularly for the suspension of a driving axle, preferably the rear axle of a vehicle. The main difference between this embodiment and the one in FIGS. 2, 8 and 9 is that it is made possible for a transmission shaft (itself not shown here) to pass through by virtue of a particular arrangement. A cut-out is provided in the intermediate support 4 (see FIG. 10, not shown in FIG. 11) and in the wheel carrier 3 (see FIG. 11). The levers 54 and 55 are also eccentric, for the same purpose (see FIG. 11). In this example the intermediate support 4 is designed to be connected to the body of the vehicle by a pair of wishbones and a track-rod (connected via the swivel-joint 73).

Figure 12:
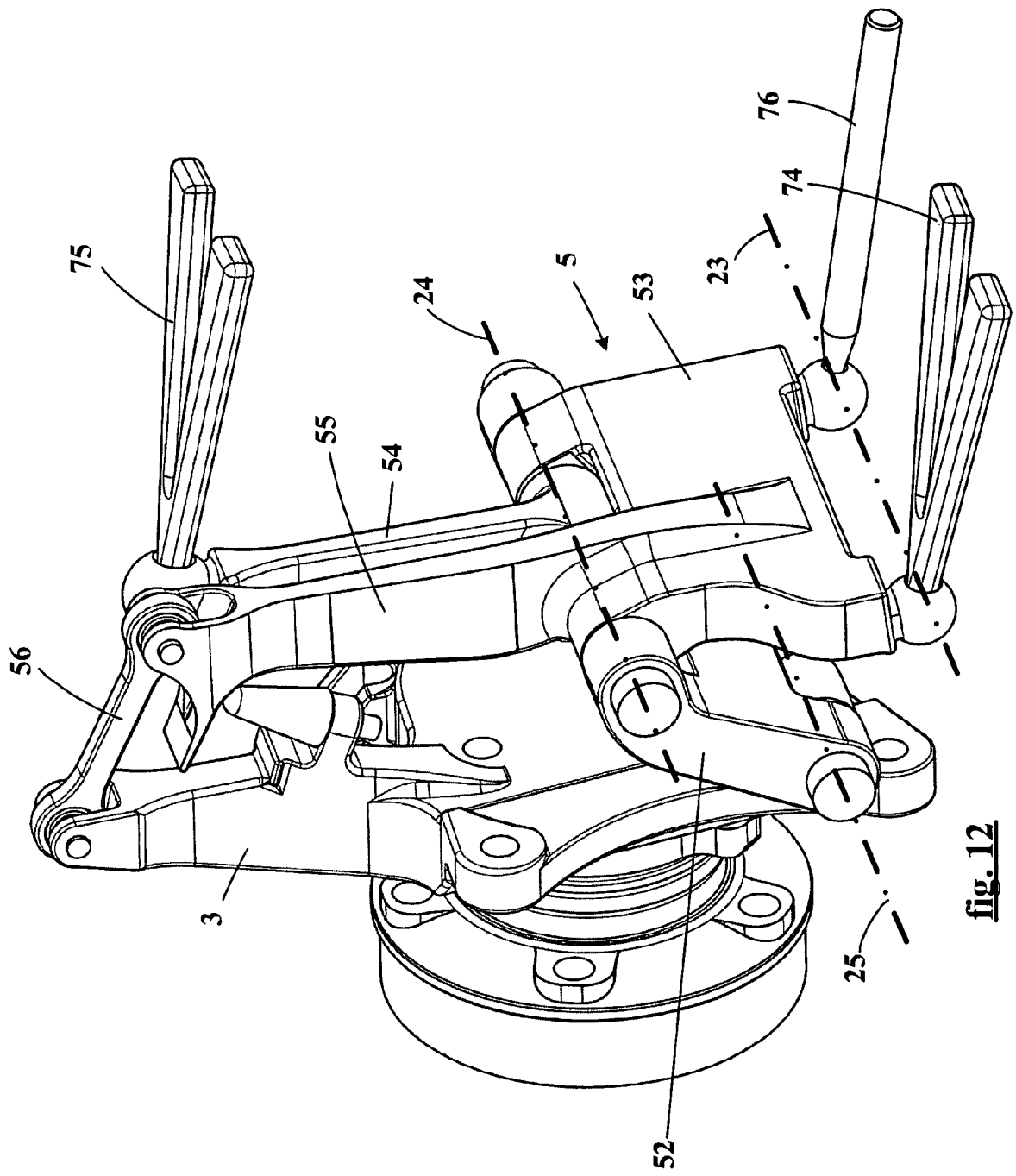
FIG. 12: Perspective view of another embodiment of the suspension system of the invention

FIG. 12 shows another embodiment of the support system according to the invention. Its main feature is that it is directly connected to the suspension arms and/or wishbones without any intermediate support, nor an inner rod (see indexes 4 and 57 in FIG. 10). An advantage is therefore that the number of components and connections is smaller. This simplification is made possible because the relative vertical mobility of the arms or lower 74 and upper 75 wishbones can be used to compensate the distance variation between the lower attachment point to the inner flange 53 and the upper one to the lever 54 attached to the outer flange 52 of the support system according to the invention. The position of the instantaneous centre of rotation for the camber movement of the wheel carrier relative to the lower wishbone 74 can be defined as described in FIG. 3 if the upper wishbone 75 is regarded as replacing the inner rod (indexed 57 in FIG. 3). Preferably, the suspension spring (not shown) rests against the lower wishbone 74.

Figure 13:
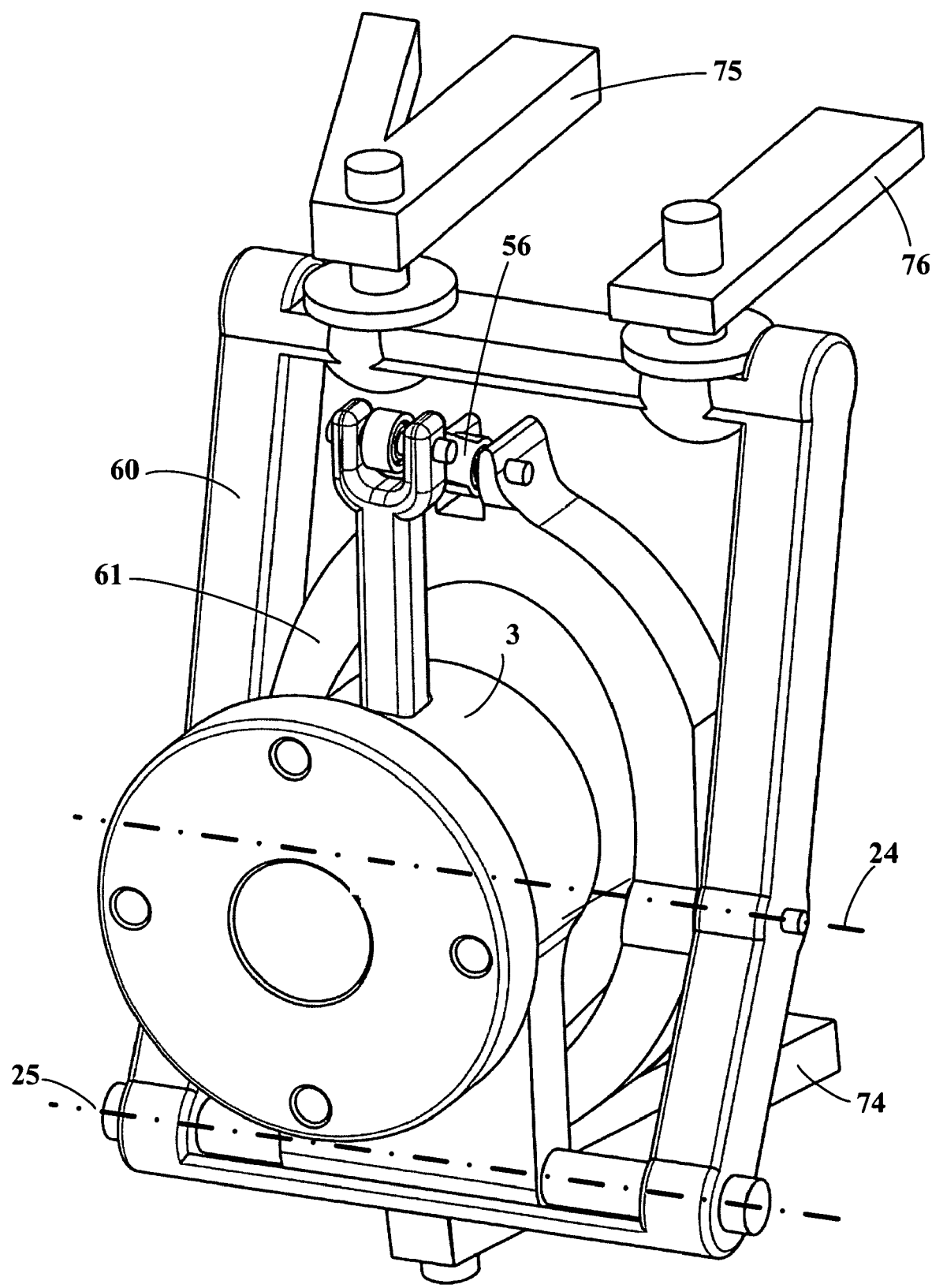
FIGS. 13 and 14: Perspective views of another embodiment of the invention
Figure 14:
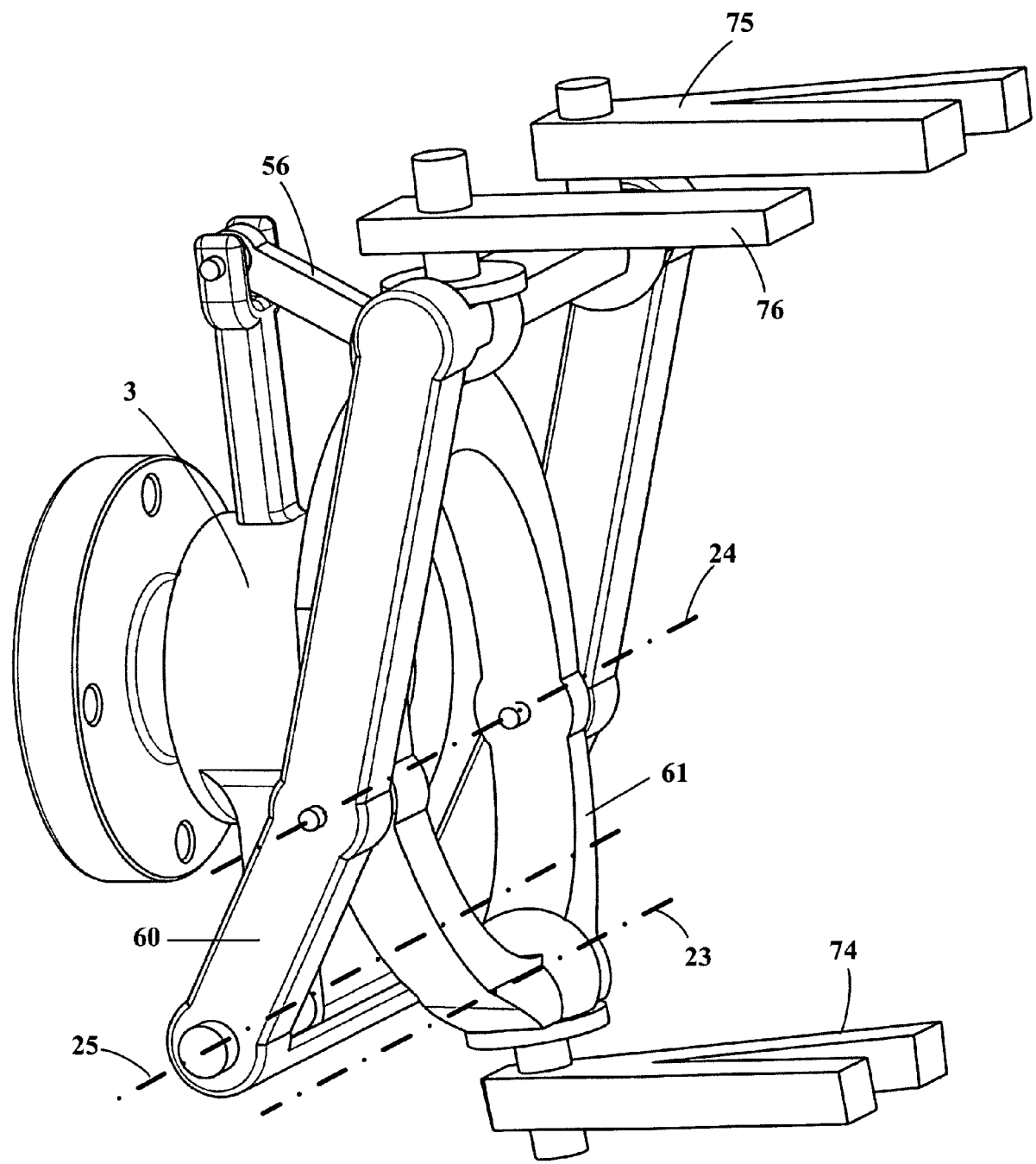

FIGS. 13 and 14 show an embodiment similar to that of FIG. 12. The kinematic principle is the same, that of a pair of scissors (60, 61) which guides the camber movement of the wheel carrier 3 relative to the suspension elements (74, 75 and 76). The position of the instantaneous centre of rotation for the camber movement of the wheel carrier relative to the lower wishbone can be defined as described in FIG. 3 if the upper wishbone 75 is regarded as replacing the inner rod (indexed 57 in FIG. 3).

However, in this embodiment the rolling or self-alignment forces are not taken up exclusively by the lower portion of the scissors (i.e. by the triple hinge) because in this embodiment the triple hinge comprises a swivel joint in place of one of its axes (the inner axis 23 in FIG. 11). An important fraction of the forces is therefore transmitted by the outer frame 60 (which constitutes one of the arms of the scissors) directly from the lower portion of the wheel carrier 3 to the upper suspension elements (75; 76). Regarding kinematic definition, the inner axis (23) is the axis parallel to the central axis (24) which passes through the swivel joint between the inner frame 61 and the lower arm 74.

The inner frame 61 (which constitutes one of the arms of the scissors) connects the lower arm or wishbone (in this case a lower wishbone 74) to the upper portion of the wheel carrier 3 via a rod 56 as before. The arm 76 can be a steering track-rod in the case of a steering axle or a pincer rod in the case of a non-steering multi-arm axle. On a non-steering axle, a trapezium can also replace the wishbone (75) and track-rod (76) assembly. A transmission shaft can pass through the centre of the system.

An advantage of this embodiment is that the steering forces (stemming from the self-alignment torque) pass through a single axis (the outer axis 25) instead of two axes in the example of FIG. 12 or three axes in the examples of FIGS. 1 to 11.

It will also be understood that to enable the connecting function of the triple hinge, its axes must be essentially parallel to one another and longitudinal. This parallelism may not be indispensable, or it can be more precise or less so. If the axes are not entirely parallel, the camber movement will be coupled with steering and/or rolling movements. Such coupling may be advantageous.

The camber connection means between the wheels of the same axle may be simple mechanical means such as those illustrated in FIG. 7. However, different means, for example using hydraulic or electric jacks whose movements are interlinked can be used, and this can have advantages for example in terms of the space occupied. Camber connection means made in the form of interconnected hydraulic jacks can for example also carry out the camber damping, blocking or active control functions described for FIG. 8.

The present invention allows very advantageous passive operation. It is also interesting for active systems that use a low energy level. If, in contrast, it is acceptable to devote considerable energy (for example electrical) to the active control of cambering, the essential characteristics of the invention concerning the position of the instantaneous centre of rotation are not necessarily indispensable. Assuming active control with high energy consumption, it would be possible for example to place greater weight on the imperatives of space and choose positions of the instantaneous centre of rotation a long way above ground level. The document EP 1275534 describes these options clearly.

The various positions of the instantaneous centre of rotation and the lateral and vertical distance values can be determined graphically as described earlier for FIG. 3, but also by numerical calculation as is done at present by specialists in this technical field of suspension systems for automobiles.

To check that a support system satisfies a given criterion concerning the position of its instantaneous centre of rotation, the following method can be used:

1—The geometry of the system when the suspension is carrying its nominal static load is determined, i.e. the positions in the camber plane of the articulation points of the various elements, the wheel plane PR, and the plane of the ground S are determined for a tyre at its normal service pressure.

2—The evolution curves of the instantaneous centre of rotation and the wheel base in the camber plane are constructed. This can be done for example theoretically, from the configuration determined in stage 1. It can also be done experimentally by artificially imposing the camber variation on the wheel carrier in order to sweep the camber deflections envisaged (for example 0° to −3°) and at the same time noting the positions of the elements so as to deduce from them the corresponding positions of the instantaneous centre of rotation. To apply the experimental method, the intermediate support (or the lower wishbone, as the case may be) must be kept immobile relative to the ground S and to the reference plane PV, for example by fixing it onto a measurement bench (marble). The wheel or tyre can then be advantageously removed. This experimental method may be limited by the presence of abutments or other design constraints. In that case the theoretical method must be used, at least for the inaccessible part of the deflection concerned.

3—The evolution so determined is compared with the characteristics of the claims.

The invention claimed is:

1. Support system (3,5,54,55) designed to connect a wheel (2) to suspension elements (4,41,74,75,76) of an automobile, the support system comprising cambering means that confer upon the wheel carrier (3) a degree of camber freedom relative to the suspension, the cambering means comprising a triple hinge (5), said triple hinge comprising three essentially longitudinal axes, said triple hinge comprising two flanges (52,53) and two levers (54, 55), each of the levers being respectively attached to one of the two flanges, a first lever of the two levers being connected to the wheel carrier (3) and a second lever of the two levers being connected to the suspension elements, the camber movement of the wheel carrier taking place around an instantaneous centre of rotation (CIR r/s), a lateral distance "dl" separating the transverse position of the instantaneous centre of rotation (CIR r/s) from the transverse position of the wheel base (BR), the system also being configured such that the distance (dl) remains smaller than 40 mm during a camber deflection ($\alpha$) of 0° to −3°.

2. The support system according to claim 1, also configured such that the distance (dl) remains smaller than 40 mm during a camber deflection of 0° to −5°.

3. The support system according to claim 2, also configured such that the distance (dl) remains smaller than 40 mm over the entire negative camber deflection.

4. The support system according to claim 1, also configured such that the distance (dl) remains smaller than 20 mm.

5. The support system according to claim 1, also configured such that the distance (dl) remains smaller than 20 mm during a camber deflection of 0° to +2°.

6. The support system according to claim 5, also configured such that the distance (dl) remains smaller than 20 mm over the entire positive camber deflection.

7. The support system according to claim 1, the instantaneous centre of rotation (CIR r/s) being located below ground level (S) and a vertical distance ($Z_{CIR}$) from the ground, the said system also being configured such that the vertical distance ($Z_{MAX}$) corresponding to the maximum positive camber deflection is larger than the vertical distance ($Z_0$) corresponding to zero camber.

8. The support system according to claim 7, the system also being configured such that the vertical distance ($Z_{MAX}$) corresponding to the maximum positive camber is larger than 2.5 times the vertical distance ($Z_0$) corresponding to zero camber.

9. The suspension system according to claim 8, also comprising at least one upper arm (75) and one lower arm (74) and in which the lower arm is connected directly to the inner flange (53) of the triple hinge and the upper arm is connected directly to the lever (54) attached to the outer flange (52) of the triple hinge (5).

10. A suspension system for an axle, comprising for each of the axle's two wheels a support system according to claim 1.

11. The suspension system according to claim 10, also comprising camber connection means (10, 11, 12; 70) that enable the camber movements of the two wheels to be linked.

12. The suspension system according to claim 11, in which the camber connection means use a link between two jacks (70) that act between the wheel carrier (3) and the intermediate support (4; 41) of each wheel on the axle.

13. The suspension system according to claim 12, in which the camber connection means comprise mechanical links (10, 11, 12) which act between the wheel carriers (3) of each wheel on the axle.

* * * * *